United States Patent [19]

Bachelder

[11] Patent Number: 4,915,410
[45] Date of Patent: Apr. 10, 1990

[54] VEHICLE AIR BAG MODULE AND METHOD OF ASSEMBLY

[75] Inventor: Theodore J. Bachelder, Pontiac, Mich.

[73] Assignee: TRW Vehicle Safety Systems Inc., Washington, Mich.

[21] Appl. No.: 276,860

[22] Filed: Nov. 28, 1988

[51] Int. Cl.⁴ .............................................. B60R 21/20
[52] U.S. Cl. ..................................... 280/732; 280/731; 280/743
[58] Field of Search ............... 280/731, 732, 728, 743

[56] References Cited

U.S. PATENT DOCUMENTS

| | | | |
|---|---|---|---|
| 3,880,447 | 4/1975 | Thorn et al. | 280/731 |
| 3,904,221 | 9/1975 | Shiki et al. | 280/741 |
| 3,944,251 | 3/1976 | Lynch | 280/731 |
| 4,005,876 | 1/1977 | Jorgensen et al. | 280/741 |
| 4,068,862 | 1/1978 | Ishi et al. | 280/40 |
| 4,153,273 | 5/1979 | Risko | 280/732 |
| 4,178,017 | 12/1979 | Ishi et al. | 280/740 |

FOREIGN PATENT DOCUMENTS

| | | | |
|---|---|---|---|
| 969990 | 6/1975 | Canada | 280/732 |
| 2335373 | 7/1977 | France | 280/732 |

Primary Examiner—David M. Mitchell
Attorney, Agent, or Firm—Calfee, Halter & Griswold

[57] ABSTRACT

A vehicle air bag module includes a container for a folded air bag and structure for attaching an inflator to the container. The container is initially assembled with an air bag disposed therein. The inflator can be attached to an exterior side of the container after the container has been assembled with an air bag. Thus, the container can be formed as an initial assembly, and the inflator can be attached to the container as the final step in the assembly of the air bag module.

24 Claims, 6 Drawing Sheets

VEHICLE AIR BAG MODULE AND METHOD OF ASSEMBLY

TECHNICAL FIELD

The present invention relates to a vehicle air bag module for containing and supporting an air bag and a gas generator. More particularly, the invention relates to a vehicle air bag module in which the gas generator may be installed in the module subsequent to installation of the air bag to provide a new and useful module assembly technique. Additionally, the present invention provides a vehicle air bag module having a new and useful structure for securing a gas generator to a wall of the module.

BACKGROUND

A vehicle air bag module is typically placed in a vehicle passenger compartment to deploy an air bag during a collision and thereby cushion a vehicle passenger from impact with vehicle structures. An air bag module generally includes a container enclosing a folded air bag and a gas generator or inflator. At the onset of a collision, the gas generator produces an inert gas (e.g., nitrogen) which is directed under pressure against the air bag to force the air bag out of the container and into the passenger compartment.

When the module is assembled, the air bag is folded in a predetermined manner in order to enable the air bag to be effectively deployed during a collision. Thus, once the air bag is properly folded in the module, its position within the module should not be disturbed. In an attempt to avoid disturbing a folded air bag, assembly of the module has typically included installation of the inflator as a first phase of assembly of the module, and installation of the air bag as the last phase of assembly of the module.

There are, however, disadvantages to installing a live inflator in a module during the first phase of assembly of a module. For example, live inflators generally include volatile propellants, pyrotechnic ignition compounds, and initiators, which can be ignited by vibration, friction, heat, shock, or other sources of energy. The more the live inflators are handled during assembly, the higher the risk of accidental ignition. Installation of live inflators during the first phase of assembly of a module results in increased handling of inflators during subsequent assembly of the air bag with the module.

In addition, modules are often transported and stored prior to assembly in a vehicle. When a live inflator is installed during the first phase of assembly of a module, the entire module, including the live inflator, must be shipped and stored as a complete unit. In the event of accidental ignition of the inflator during shipping or storage, the entire module, including the air bag and container, is likely to be damaged.

To reduce the risk of accidental ignition, it is desirable to reduce the amount of handling of the inflators prior to installation in a vehicle. Such a reduction can be obtained by installing the live inflators as the final step of module assembly. Installing the inflators during final assembly also permits the inflators to be stored and shipped separately from the other portions of the modules. Thus, if accidental ignition occurs during storage or shipment, the other portions of the module will not be damaged.

Some air bag module designs have reflected concern over the possibility of accidental ignition. U.S. Pat. No. 4,153,273, for example, provides a diffuser secured on the inside of an air bag, and locates the air bag and the diffuser within a container. A dummy gas generator is installed in the diffuser during initial assembly of the module. A live gas generator is installed later during the final assembly stage when the module is completed.

SUMMARY OF THE INVENTION

The present invention provides a new and useful air bag module construction to enable installation of the inflator without interfering with an installed air bag, and a new and useful assembly technique allowing installation of the inflator as the last step in assembly of the module.

In accordance with the preferred embodiment of the present invention, a vehicle air bag module includes a container for a folded air bag, and an inflator secured to the container. The air bag is installed in the container as the container is assembled. The inflator can be secured to a wall of the container as the last step of the assembly of the module. Thus, the container can be assembled, transported and stored separately from the inflator. The inflator can be secured to the container whenever it is desirable to complete the module.

The container includes a wall having an interior side adapted to be secured to an air bag. During assembly of the module, the air bag is secured to the interior side of the wall, and the air bag is then folded into its predetermined configuration. The interior side of the wall also has a surface portion which matches part of the profile of the inflator. When the air bag is secured to the wall, the surface portion effectively defines (reverses) the space corresponding to the part of the inflator normally disposed adjacent the folded air bag. Thus, the air bag can be properly folded with respect to that space in order to be most effectively deployed. After the bag is folded, a cover is connected to the wall, to complete the container with the folded air bag therein.

The inflator is secured in an inflator cavity formed in part by the exterior side of the wall. According to the preferred embodiment, the inflator cavity is formed by a cradle in the exterior side of the wall and an inflator retainer which is coupled to the wall. The cradle is configured to receive part of the inflator. The inflator retainer is designed to surround a part of the inflator which protrudes from the cradle, and to hold the inflator in the cradle.

An alignment structure enables an inflator to be located properly in the inflator cavity. Specifically, the wall includes an opening for alignment with the gas dispensing nozzles of the inflator. The alignment structure enables the inflator to be located in the inflator cavity with its gas dispensing nozzles located in alignment with the opening in the wall. When an inflator is properly aligned and installed in the inflator cavity, its gas dispensing nozzles are located properly to direct gas against the folded air bag to deploy the air bag from the container. According to the preferred embodiment, the alignment structure comprises an alignment pin on the inflator and a mating recess formed in the wall.

In assembling the air bag module, the air bag is first secured to the interior side of the wall. The air bag is then folded to its predetermined configuration. The portion on the interior side of the wall which matches the profile of the inflator enables the air bag to be properly folded relative to the wall. Next, the air bag cover is secured to the wall to complete the air bag container with the folded air bag therein.

The inflator can be secured to the container whenever it is desired to complete the module. To secure the inflator to the container, the inflator is partially disposed in the cradle formed in the exterior side of the wall, and the inflator retainer is then coupled to the wall to complete the inflator cavity and to secure the inflator to the wall. The alignment structure enables the inflator to be properly aligned with respect to the container as the inflator is being secured to the container.

The inflator retainer is preferably an arcuate band of spring steel which surrounds the portion of the inflator protruding from the cradle in the wall. Attachment portions integral with the wall engage the arcuate band to couple the band with the wall and capture the inflator within the inflator cavity. The band is flexible and resilient, and is designed to be flexed manually for attachment to the wall. Once attachment to the wall, the resilient band exerts a biasing force on the inflator to hold the inflator in position on the container.

The foregoing structure and assembly technique enables air bag containers and inflators to be separately assembled, transported and stored. Final assembly of the module can take place at the place and time the module is installed in a vehicle.

Other features and advantages of the present invention will become apparent from the following detailed description and accompanying drawings which form a part of the specification.

DETAILED DESCRIPTION OF THE PREFERRED EMBODIMENT

Figure 1:
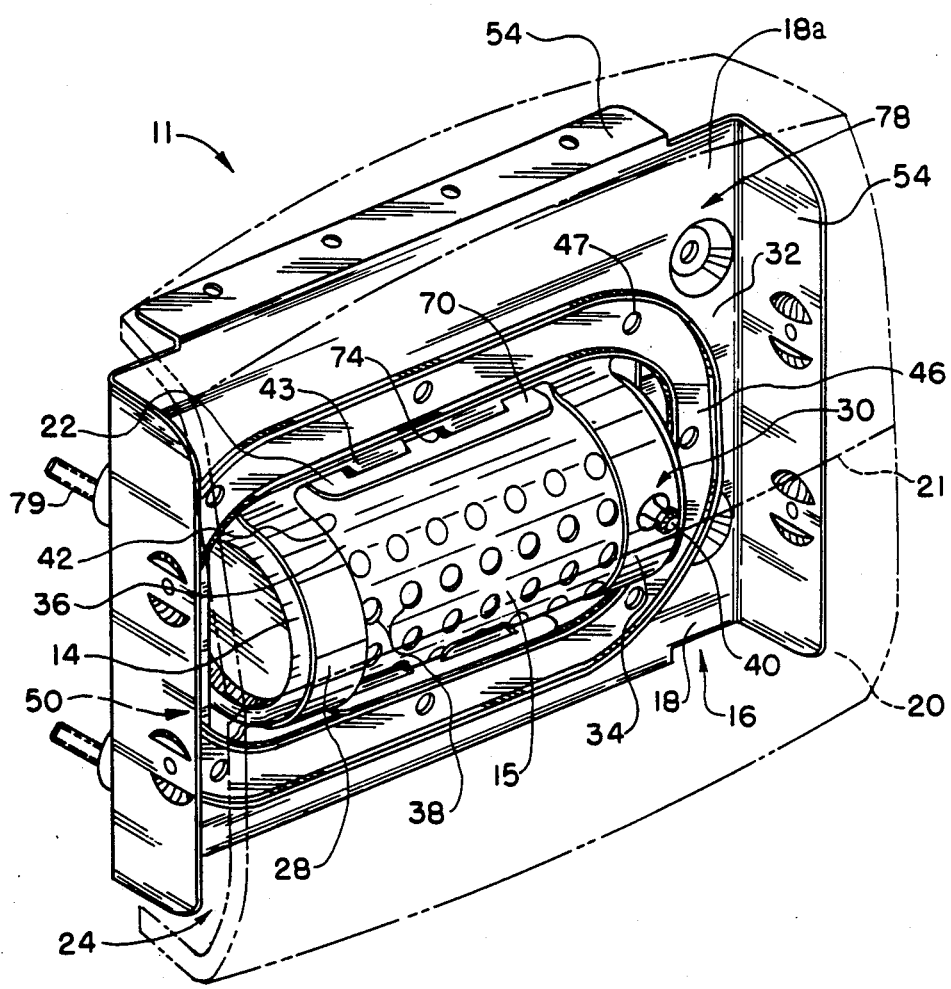
FIG. 1 is a perspective view of a vehicle air bag module constructed in accordance with the present invention, and with certain portions omitted and other portions illustrated in phantom lines.
Figure 2:
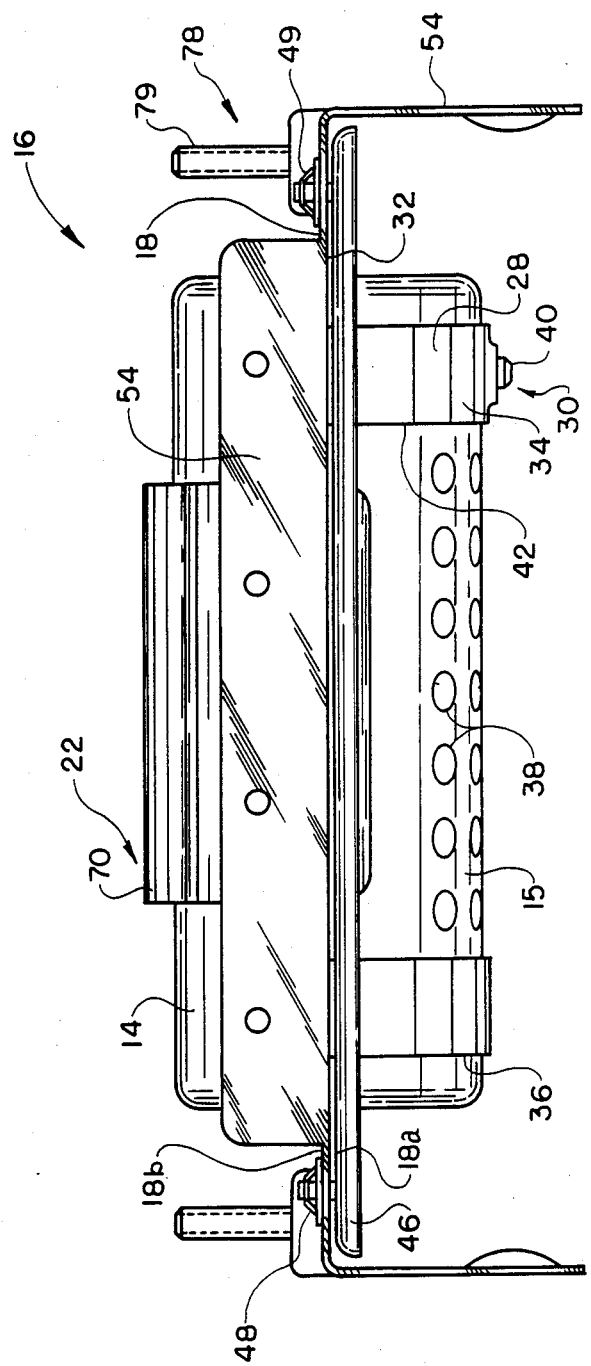
FIG. 2 is a side view of the air bag module of FIG. 1 with the air bag and air bag container omitted.
Figure 3:
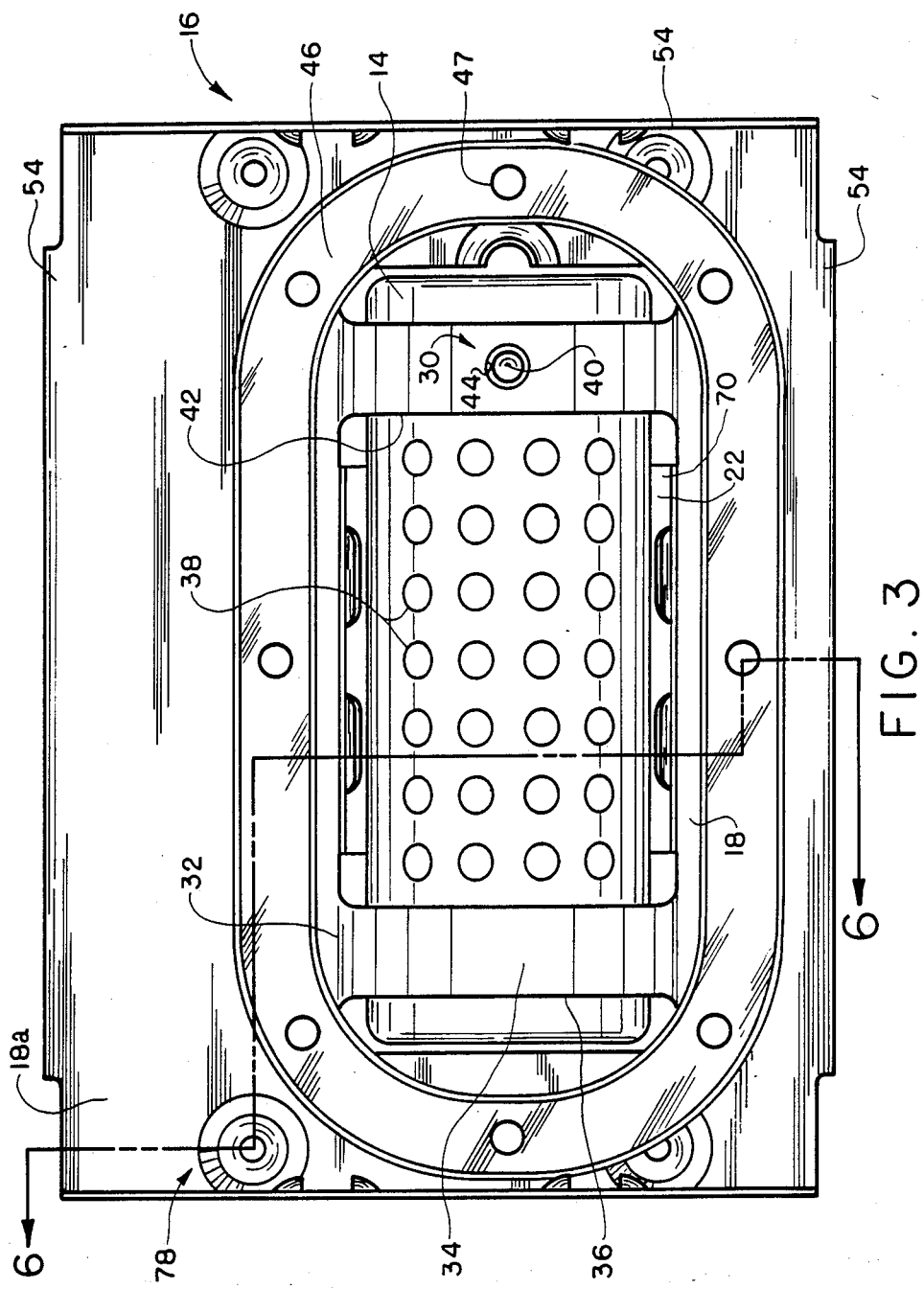
FIG. 3 is a top view of the air bag module of FIG. 2.
Figure 4:
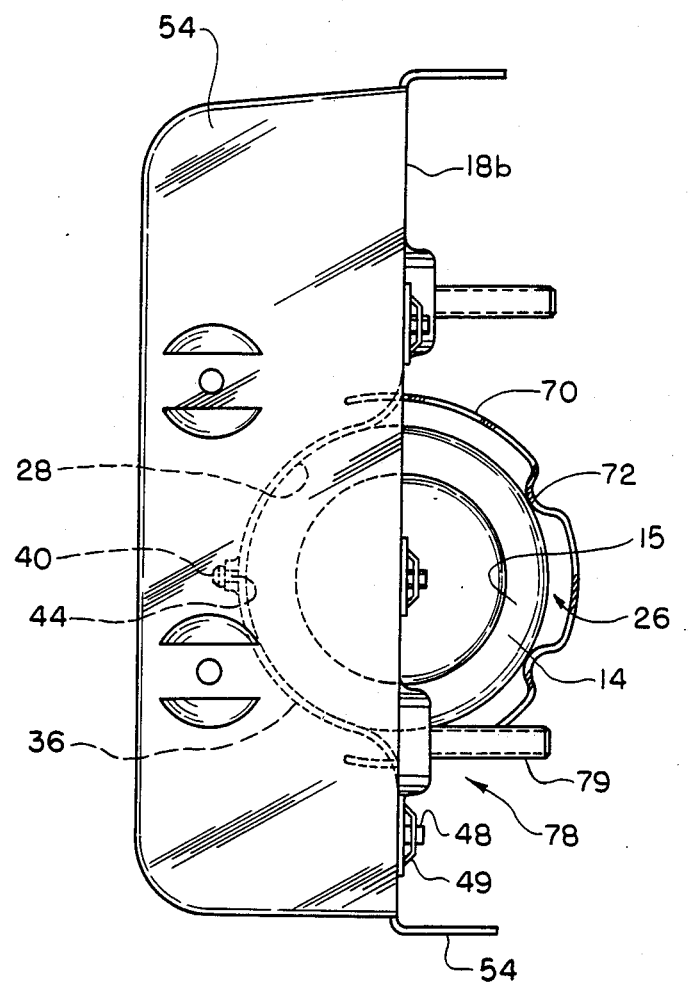
FIG. 4 is an end view of the air bag module of FIG. 2.
Figure 5:
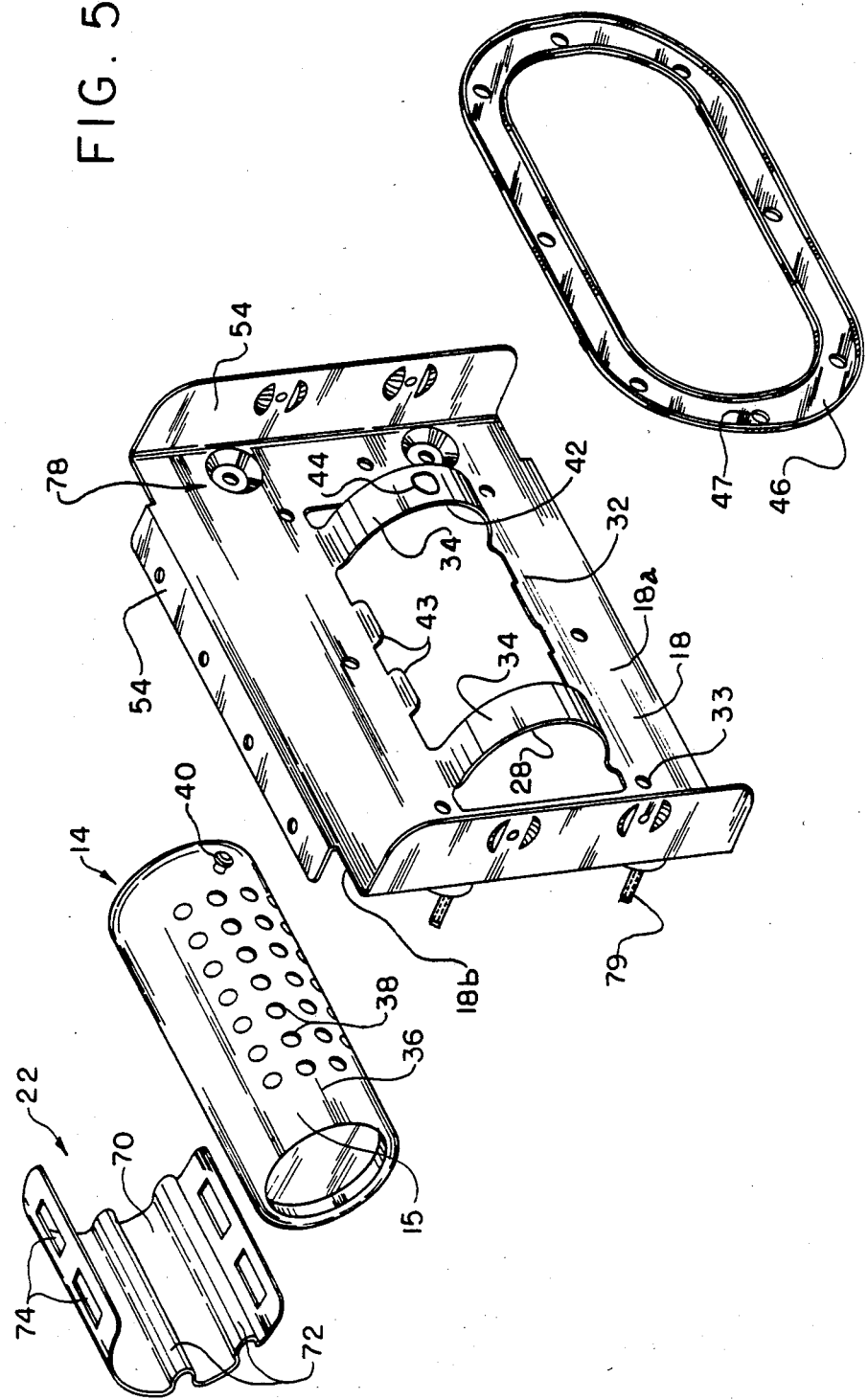
FIG. 5 is an exploded perspective view of certain portions of the air bag module prior to assembly.

Referring to the figures, an air bag module 10 comprises an air bag container 11 and a cylindrical inflator 14 (gas generator) secured to the container 11. The air bag container 11 has an interior cavity 24, and a folded air bag 12 is disposed in the interior cavity when the air bag container is assembled. The inflator 14 is attached to the air bag container 11 after the container 11 has been assembled. Attachment of the inflator 14 to the container 11 completes the air bag module 10.

The air bag container 11 includes a wall 18 and a cover 20. The cover 20 is secured to the wall 18 to form the air bag container 11. The interior side 18A of the wall 18 defines part of the interior cavity 24 of the air bag container 11.

An inflator cavity 26 is formed on the exterior of the container 11. The inflator cavity 26 is formed by a portion of the exterior side 18B of the wall 18 and an inflator retainer 22 which is designed to be attached to the wall 18. The structure forming the inflator cavity 26 supports and secures the inflator 14 on the exterior of the container 11.

The wall 18 is formed of sheet steel, and has (i) a pair of spaced apart, arcuate bands 34 and (ii) a central opening 42 formed between the bands. The arcuate bands 34 provide a convex profile on the interior side 18A of the wall 18 and a cradle 28 on the exterior side 18B of the wall 18. The convex profile on the interior side 18A of the wall 18 simulates the profile of the inflator, and enables the air bag to be folded in a predetermined pattern relative to the convex profile. Thus, the convex profile enables an air bag to be properly folded relative to the inflator which is to be later secured to the container 11 to complete the air bag module 10. The cradle 28 forms part of the inflator cavity 26 which supports and secures the inflator 12 to the container 11, as explained further hereinafter.

The interior side 18A of the wall 18 includes a substantially flat surface 32 surrounding the opening 42 and the convex profile formed by the arcuate bands 34. The substantially flat surface 32 is adapted to engage a mouth 12A of a vehicle air bag 12. An air bag retainer member 46 is adapted to be secured to the wall 18, and functions to clamp the mouth 12A of the air bag 12 against the substantially flat surface 32, as explained more fully hereinafter. When the mouth 12A of the air bag 12 is clamped against the surface 32, the air bag 12 may be folded to its predetermined configuration.

After an air bag is secured to the wall 18, and has been properly folded relative to the wall 18, the cover 20 is connected to the wall 18 to complete the air bag container 11. Specifically, a pair of flanges 54 are formed in one piece with and adjacent the outer periphery of the wall 18, and extend generally perpendicular to the substantially flat surface 32 of the wall. The cover 20 comprises a central portion 20A and attachment portions 20B adapted to mate with the flanges 54 on the wall. A series of rivets 60 connect the attachment portions 20B of cover 20 to the flanges 54 of the wall 18, to secure the cover 20 to the wall 18.

Figure 6:
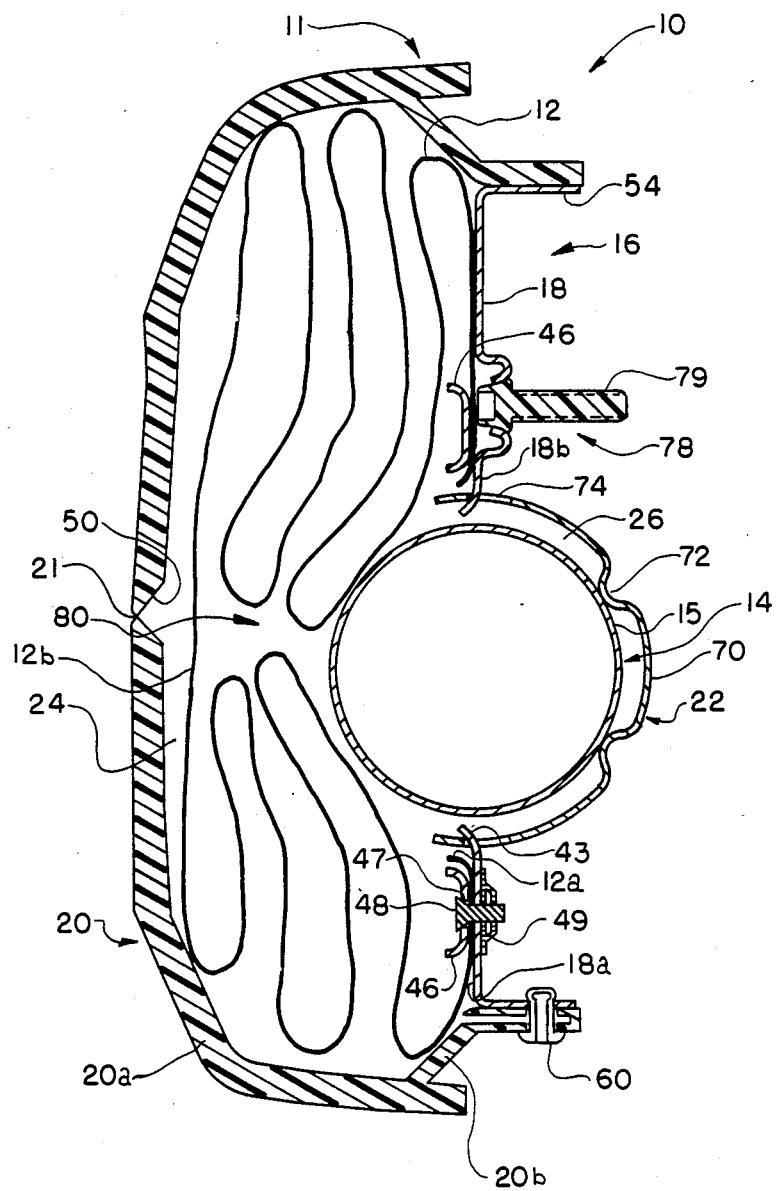
FIG. 6 is a cross-sectional view of an air bag module constructed in accordance the present invention, with all portions included, and as taken along the line 6—6 of FIG. 3.

The cover 20 is preferably made of the type of material (e.g. polyvinylchloride) which is typically used to mold vehicle dashboards. The inside of the cover 20 has an internal V-shaped recess 50 (FIG. 6) disposed in a predetermined configuration. The V-shaped recess 50 selectively weakens the cover at a predetermined location 21, to enable the cover 20 to separate into segments when the air bag 12 is being deployed. The structure and function of the V-shaped recess in the cover 20 is well known to those in the art, and need not be described further.

Thus, it should be clear from the foregoing discussion that the air bag container 11, with the folded air bag 12 therein, is formed as a separate assembly. The assembled container can be shipped and stored as a separate unit, without an inflator secured thereto. An inflator 14 can be secured to the assembled container 11, whenever it is desired to complete the air bag module 10, by means of the structure and assembly technique described hereinafter.

As discussed above, the inflator retainer 22 and the cradle 28 on the exterior side 18B of the wall 18 combine to form the inflator cavity 26. The inflator retainer 22 preferably includes a flexible, resilient arcuate band 70 with transverse ribs 72 and apertures 74 at each end for engagement with tabs 43 bent from the wall 18 adjacent the opening 42. The band 70 is formed of spring steel which has been preferably austempered through conventional heating, quenching and curing processes to obtain the strength and resiliency desired. In order to secure the band 70 to the wall 18, the band 70 is squeezed (preferably manually) to flex the band to enable the ends of the band to extend partly into the central opening 42 formed in the wall 18. When the band is released, its resiliency causes the connecting apperatures 74 to surround and engage the tabs 43 to secure the band 70 to the wall 18. Securing the band 70 to the wall 18 completes the inflator cavity and secures the inflator in the cavity, as discussed further below.

The inflator 14 has a cylindrical outer housing 15. The outer housing 15 has a plurality of gas dispensing nozzles 38 for rapidly directing gas from the inflator 14 when the inflator is ignited. Gas is generated by the inflator 14 upon ignition of solid, volatile propellant disposed within the housing 15. The internal structure and operation of the inflator 14 can be of a number of well known structures, and forms no part of the present invention.

When the inflator 14 is assembled with the container 11, a portion 36 of the inflator 14 is disposed in the cradle 28 formed by the arcuate bands 34. Alignment structure 30 is also provided to ensure that when the inflator is assembled with the container, the gas dispensing nozzles 38 of the inflator will be aligned with the opening 42 in the wall 18. The opening 42 enables gas to be dispensed into the air bag supported in the interior cavity 24 of the container 11 upon ignition of the inflator 14.

The alignment structure 30 comprises an alignment pin 40 extending from the inflator housing 15, and an alignment opening 44 in one of the arcuate bands 34. The alignment opening 44 is designed for mating engagement with the alignment pin 40 on the inflator 14. When the alignment opening 44 is engaged with the alignment pin 40 on the inflator, the inflator nozzles 38 will be aligned with the opening 42 in the wall 18 to direct the gas dispensed by the inflator 14 through the central opening 42 in the wall 18 and into the interior cavity 24 of the container 11.

Assembly of the vehicle air bag module 10 is divided into two phases: initial assembly and final assembly. During initial assembly, the container is assembled with the folded air bag therein. During final assembly of the module 10, the inflator 14 is connected with the container 11.

The first step in initial assembly of the air bag module is to secure the air bag 12 to the wall 18. the mouth 12A of the air bag 12 is disposed against the substantially flat surface 32 on the interior side 18A of the wall 18, and is secured to the wall 18 by the airbag retainer member 46. Specifically, the retainer member 46 has apertures 47 which can be aligned with apertures 33 in the wall 18 and apertures (not shown) in the air bag material. A series of bolts 48 and cooperating push pins 49 secure the retainer member 46 to the wall 18 to clamp the mouth 12A of the air bag 12 against the wall 18.

Once the mouth of the air bag 12 is securely clamped to the wall 18, the air bag 12 is folded to its predetermined configuration. Folding of the air bag is preferably accomplished by layering portions of the air bag in the pattern shown in FIG. 6. By layering folds of the air bag in the configuration shown, a clear space 80 is provided between the mouth 12A of the air bag and the distal portion 12B of the air bag 12. Gas entering the air bag 12 through the mouth 12A of the air bag is thus directed via the clear space 80 directly against the distal portion 12B. Folding of the air bag in such a configuration enables rapid and effective deployment of the air bag 12 upon ignition of the inflator.

Once the air bag 12 is folded into the desired configuration, it may be temporarily secured in such configuration by a strap or other flexible fastener (not illustrated), until the air bag cover 20 is secured to the wall 18. The air bag cover 20 is secured to the wall by fastening the attachment portions 20B of the cover to the flanges 54 of the wall 18 using rivets 60. When the cover 20 is secured to the wall 18, the assembly of the container 11 is complete, and the air bag 12 is retained by the cover in the desired folded configuration in the interior cavity of the container 11. When the container 11 has been assembled, it may be packaged and shipped to a storage location to await further shipment and/or final assembly and installation within a vehicle.

To complete the air bag module 10, the inflator 14 is connected with the container 11. The inflator is placed in the cradle 28 in the wall 18, in an orientation such that the alignment pin 40 on the inflator mates with the alignment opening 44 in the wall 18. In that orientation, the nozzles 38 of the inflator will be properly aligned with the central opening 42 in the wall 18. The arcuate, resilient retainer band 70 is then disposed about the inflator 14 and is connected to the wall 18 to form the inflator cavity 26 and to secure the inflator 14 therein. Specifically, the arcuate resilient band 70 is squeezed (preferably manually) to flex the band 70 to enable the ends of the band having the apertures 74 to extend partially into the opening 42 in the wall 18. When the apertures 74 have cleared the tabs 43, the band is released. The resiliency of the band will cause the ends of the band to spring outward and the apertures 74 of the band will mate with and engage the tabs 43 to secure the band 70 to the wall 18. Moreover, as the ends of the band 70 spring outward, the ribs 72 will be resiliently drawn against the inflator 14 to bias the inflator into secure engagement with the cradle formed by the arcuate bands 34. The biasing force is designed to resist movement of the inflator relative to the container 11. Thus, the module is completed and ready for vehicle installation.

Installation of the module within a vehicle is facilitated using fastener locations 78 having a portion of a threaded fastener 79 extending from the exterior side 18B of the wall 18 to secure engagement with the vehicle. Mounting of the module within the vehicle either behind the dashboard or at the steering wheel center using such fasteners or, for example, heat shields, flaps and/or brackets (not illustrated), requires the use of installation techniques which are well known to those of ordinary skill in the art, and need not be discussed further.

While the preferred embodiment of the invention has been described in detail, it should be apparent that the invention can be incorporated into air bag modules of other materials, constructions, and designs, that such additional modifications will be apparent to those of ordinary skill in the art, and that it is intended to cover all devices incorporating the present invention as defined within the appended claims.

I claim:

1. Apparatus comprising an air bag module for an air bag and an inflator,
said module comprising, (i) an air bag container having a wall defining part of an air bag cavity with an air bag completely contained therein, said wall having a surface for engagement with a portion of said air bag, (ii) means defining an inflator cavity outside of, and in communication with, said air bag cavity, for receiving said inflator when said air bag is disposed in said air bag cavity, and (iii) alignment means for aligning said inflator in a predetermined position in said inflator cavity when said air bag is disposed in said cavity.

2. The apparatus of claim 1 wherein said means defining said inflator cavity comprises a cradle in said wall shaped to match a predetermined portion of the profile of an inflator, said cradle having opposite first and second sides, said first side defining part of said inflator cavity, said second side defining part of said air bag cavity and said air bag being folded in a predetermined pattern relative to said second side.

3. The apparatus of claim 2 wherein said first and second sides of said cradle are each partially cylindrical, said first side being adapted to receive a portion of a cylindrical inflator, and an arcuate band for attachment to said wall and dimensioned to surround a portion of a cylindrical inflator protruding from said cradle, said arcuate band cooperating with a said first side of said wall to define said inflator cavity, and said arcuate band adapted to exert a biasing force on said inflator for holding said inflator against the partially cylindrical first side of said cradle.

4. The apparatus of claim 3 wherein said inflator includes an alignment member and a gas dispensing portion, said wall further including an opening for alignment with the inflator gas dispensing portion of the inflator, and said alignment means includes an alignment opening in said wall for receiving the alignment member and properly aligning the gas dispensing portion of said inflator with said opening in said wall.

5. The apparatus of any of claims 1-4 wherein said container comprises a cover secured to said wall and cooperating therewith to define said air bag cavity.

6. Apparatus comprising a wall for forming part of an air bag container and means for securing an inflator to said wall, said wall having opposite first and second sides, said first side of said wall adapted to engage a vehicle air bag, said second side of said wall defining a recess shaped to receive a selected portion of an inflator, and said means for securing an inflator to said wall when a selected portion of the inflator is received in said recess of said second side of said wall.

7. The apparatus of claim 6 wherein said first side of said wall includes a profile conforming with the selected portion of an inflator to enable said wall to reserve space conforming to the shape of the inflator during folding of the air bag adjacent said first side of said wall.

8. The apparatus of claim 7 wherein said recess is in part cylindrical for receiving a portion of a cylindrical inflator with a remaining portion of the cylindrical inflator protruding from said recess, and said means for securing an inflator to said wall comprising an arcuate band for attachment to said wall and dimensioned to surround the remaining portion of a cylindrical inflator protruding from said recess.

9. The apparatus of claim 8 wherein the partially cylindrical portion of said recess includes an opening for alignment with gas dispensing nozzles of a cylindrical inflator and an opening for receiving an alignment member on a cylindrical inflator for properly aligning the cylindrical inflator in the recess.

10. The apparatus of claims 6-9 further including a cover for attachment to said wall to complete a container for a folded air bag.

11. Apparatus comprising a container having a folded air bag therein and support structure for securing an inflator to said container, said support structure including a wall of said container having an internal surface on the inside of said container and an external surface on the outside of said container, said external surface of said wall configured for receiving a selected portion of an inflator, and means for securing the inflator to said wall when the selected portion of the inflator is received against said external surface of said wall.

12. The apparatus of claim 11 wherein said external surface of said wall includes a partially cylindrical cradle dimensioned to receive a selected portion of a cylindrical inflator with the remaining portion of the cylindrical inflator protruding from the cradle, said means for securing the inflator to the container comprising an arcuate band for attachment to the wall, and said arcuate band dimensioned to surround the remaining portion of a cylindrical inflator protruding from the cradle.

13. The apparatus of claim 12 wherein the partially cylindrical cradle includes an opening for alignment with gas dispensing nozzles on the selected portion of the cylindrical inflator, and said wall includes an alignment opening for receiving an alignment member on the cylinder inflator to properly align the cylindrical inflator in the cradle.

14. The apparatus of claim 13 wherein the said internal surface of said wall has a partially cylindrical profile matching the profile of the selected portion of a cylindrical inflator, said air bag being folded in a predetermined pattern relative to said partially cylindrical profile.

15. The apparatus of claim 14 wherein the arcuate band is resilient and is adapted to exert a biasing force on said inflator to hold said inflator in said cradle, and the wall includes integral attachment portions adapted for connection with the arcuate band for coupling the arcuate band with the wall.

16. The apparatus of claim 15 wherein the wall is made of sheet metal, and the arcuate band is made of spring steel.

17. The apparatus of claim 16 wherein said container comprises a cover secured to said wall.

18. A method of assembling an air bag container and an inflator comprising the steps of:

providing a wall forming part of said container;

securing an air bag to one side of said wall;

folding the air bag to a predetermined configuration relative to said one side of said wall;

securing closure structure to said wall to complete the air bag container with the folded air bag therein; and aligning and securing said inflator in an inflator cavity formed at least partially in the other side of said wall.

19. The method as set forth in claim 18 wherein said one side of said wall comprises a portion having a profile matching at least part of the profile of the inflator, and wherein the step of folding the air bag comprises folding the air bag in a predetermined pattern relative to said portion of said one side of said wall.

20. The method as set forth in claim 19 wherein the step of aligning and securing said inflator in the inflator cavity comprises the steps of disposing an inflator in said inflator cavity formed in the other side of said wall and securing said inflator therein.

21. The method as set forth in claim 20 wherein said step of aligning and securing further includes bringing alignment portions of said inflator and said wall into mating engagement.

22. The method as set forth in claim 21 wherein said inflator cavity comprises a portion of said other side of said wall and a retainer connected with said wall, said retainer comprising a flexible resilient band, and said step of aligning and securing comprising the step of flexing said band about said inflator in connecting said band with said wall and allowing said band resiliently to return to a position in which it holds said inflator securely against said wall.

23. The method as set forth in any of claims 17-22 wherein said inflator is cylindrical.

24. The apparatus of claim 13, wherein said gas dispensing nozzles on the selected portion of the cylindrical inflator are disposed to direct gas radially out of the cylindrical inflator through said opening in the partially cylindrical cradle.

* * * * *